AUTOMATIC PROGRAM SELECTOR DEVICE

Filed March 3, 1967

INVENTOR.

Richard H. Walburn

United States Patent Office 3,518,379

Patented June 30, 1970

3,518,379

AUTOMATIC PROGRAM SELECTOR DEVICE

Richard H. Walburn, 6220 Kentwood Place, Fort Worth, Tex. 76112

Filed Mar. 3, 1967, Ser. No. 620,301
Int. Cl. G11b 15/24
U.S. Cl. 179—100.1 7 Claims

ABSTRACT OF THE DISCLOSURE

An automatic song selector for tape recorders having an adjustable counter device with automatic switch means which will wind and rewind the tape reels without the user having to monitor the tape recorder.

This invention relates to music selecting apparatus, and more particularly to a song selector device for tape recorders.

It is therefore the main purpose of this invention to provide an automatic song selector device for tape recorders which will be utilized on all model tape recorders having the automatic shut-off feature. Most tape recorder enthusiasts place record albums on tape and save their records for special occasions, or perhaps enthusiasts may borrow records from friends; however, in any case it is imperative that they keep an accurate record of them.

If a tape recorder user had a 3,600 foot tape on his recorder, he would list the different record albums on the tape reel or tape box according to what his footage counter read. For an example, suppose the enthusiast had a Glenn Miller aulbum from 0–606 on the footage counter, The Ventures from 606–1178, The T-Bones from 1997–3600. The tape being edited properly everything is all right, but supposing the enthusiast is not interested in listening to Glenn Miller, The Ventures, or the T-Bones but in the Mitch Miller album. He would rewind the recorder down to 1997 and the punch the play button to hear Mitch Miller. This works excellently except when the enthusiast does not have all day which in this case would mean about a four minute wait for him watching the footage counter to come up to 1997.

This invention eliminates all the useless waiting by having the enthusiast set the footage counter to 1997 while he does some chore while in the meantime the recorder will shut off automatically at 1997. Now all the enthusiast has to do is to turn off the automatical song selector and push the play button whereupon he will commence to listen to Mitch Miller. In the event he has played the reel down to the Mitch Miller album and he doesn't want to hear Mitch Miller, but wants to hear The Ventures again, The Ventures being located at 606 on the footage counter, all he has to do is subtract 606 from 1997 and proceed to set the footage counter of the automatic song selector to 1391, whereupon he proceeds to push the rewind button and goes somewhere else in the dwelling and the recorder when reaching that point will shut off automatically of 606. When this is accomplished the enthusiast will then push the automatic song selector to off position and will then push the play button and listen to The Ventures.

Another object of this invention is to provide an automatic song selector device which will work in parallel with the automatic recorder shut off wiring circuit (present in the recorder). The automatic song selector is provided with a commercial footage counter which enables the user to preset each numerical character, unlike the common art footage counter present on tape recorders. The automatic song selector is unique due to the fact that it has a set of contacts which are closed (only) when the selector reads four zeros. When the song selector is not in use the selector will be turned off so that the recorder will not be turned off when four zeros appear when not desired. This invention is of such construction that the device operates in conjunction or in series with the present or self-contained footage counter, it being connected to the contained footage counter drive belt.

Still another object of this invention is to provide a song selector device which when four zeros appear on the song selector counter, the switch contacts will close. The selective switch of the device is in parallel with the rewind shut off switch, so power is sent to the shut off solenoid. After this occurs the automatic song selector switch must be turned off to prevent the recorder from being shut off when four zeros appear when undesired.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

DESCRIPTION OF THE PREFERRED EMBODIMENT

In the preferred embodiment, the song selector includes a revolution counter 11 which is enclosed in a small housing 41. This housing includes an upper wall member 42 in which a plurality of spaced apart rectangular windows 43 are provided.

Figure 1:
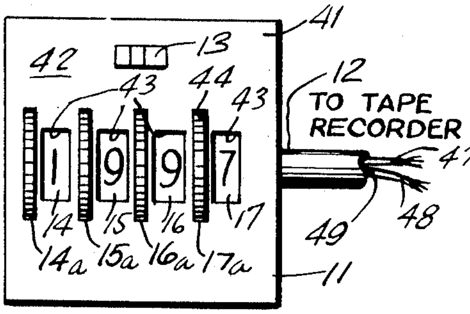
FIG. 1 is a top plan view of the selection wheel device of the present invention.

A plurality of counter wheels 14–17 are mounted in a spaced apart relationship along a common axis inside the housing 41. The number of wheels corresponds to the number of windows 43, and each of the wheels is in registry with one of the windows. Thus, each wheel can be thought of as being associated with one of the windows. Each of the wheels has the ten digits 1–0 imprinted around its outer edge in a circumferentially spaced apart relationship. As can be seen in FIG. 1, these digits are visible through the windows 43 and serve to indicate the rotational positions of the respective wheels.

An input shaft 11' is rotatably mounted in the housing 41, with one end of the shaft extending through the bottom wall of the housing. Conventional drive means is provided intermediate the input shaft and the counter wheels 14–17 for driving the wheels in such manner that the digits appearing through the windows correspond to the number of revolutions made by the input shafts. Thus, the wheels 14, 15, 16 and 17 serve as thousands, hundreds, tens, and units counters, respectively.

Figure 4:
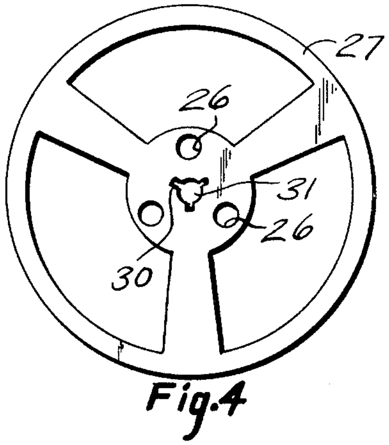
FIG. 4 is a plan view of a tape reel.
Figure 6:
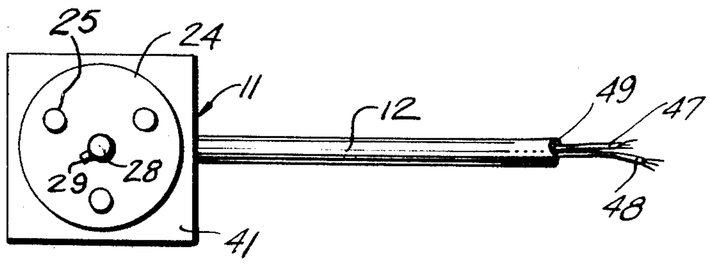
FIG. 6 is a bottom plan view of FIG. 5.

Means is provided for removably mounting the revolution counter 11 on either the supply reel or the take-up reel on a conventional tape recorder. This means includes a mounting disc 24 which is secured to the outer end of the input shaft 11'. A plurality of cylindrical lugs 25 are provided on the bottom surface of the disc 24. These lugs are circumferentially spaced about the axis of the input shaft 11' and are adapted for engaging the openings 26 which are included in the hub portion of a conventional tape reel 27, as illustrated in FIG. 4. A central lug 28 with a radially extending key 29 is also provided on the bottom of the mounting disc 24. This lug and key are adapted for engaging the central opening 31 and keyway 30 of the conventional tape reel.

When the lugs 25 and 28 are inserted in the openings 26 and 31, the lower surface of the mounting disc 24 engages the upper surface of the hub portion of the tape reel 27, whereby the counter is supported by the tape reel. In the preferred embodiment, rotation of the entire counter with the input shaft and reel is prevented by the connecting cable 12, discussed hereinafter, which extends between the counter and the tape recorder. Alternatively, as will be apparent to those familiar with the art, a simple bracket can be provided for this purpose.

Figure 3:
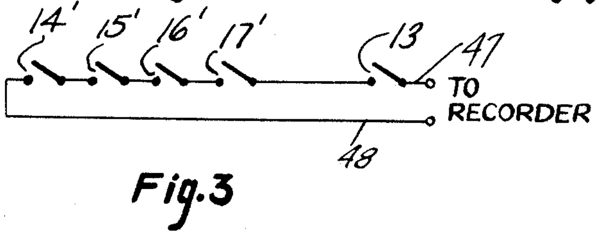
FIG. 3 is a schematic wiring diagram of the wheel device shown in FIG. 1.
Figure 5:
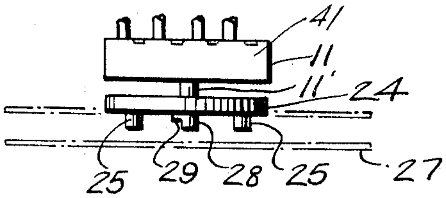
FIG. 5 is a side elevation of the tape reel engaging device.

Switch means is operably connected to the revolution counter and adapted for actuation when the number registered by the counter reaches a predetermined value. This means includes a set of contacts connected to each of the counter wheels and designated by the reference numerals 14′–17′. Each set of contacts is adapted for closing only when the visible digit on its wheel corresponds to its predetermined value. As illustrated in FIG. 3, the switches 14′–17′ are connected electrically in series so that an electrically conductive circuit is provided through the switches only when the predetermined digits appear on each of the counter wheels. In the preferred embodiment, each switch closes when a 0 appears in the window associated therewith.

An additional switch 13 is also mounted on the counter housing and connected in series with the contacts 14′–17′. This switch provides means for disconnecting the selector device when its use is not desired.

Means is provided for rotating each of the counter wheels independently of the remaining wheels and the input shaft, thereby permitting an indexing number to be preset on the counter. This means includes a knurled disc **14*a*–17*a* forming a part of each of the counter wheels and extending through an opening 44 formed in the upper panel 42 of the counter housing 41**.

The series of switches in the counter is connected electrically to the motor shutoff circuit 46 of the tape recorder by a cable 12. This cable includes a pair of insulated conductors 47 and 48, one of which is connected to each end of the series of switches. The cable also includes an outer jacket 49 which is fabricated of a material of sufficient rigidity that the cable is able to anchor the counter housing against rotation, as is discussed hereinbefore.

Figure 2:
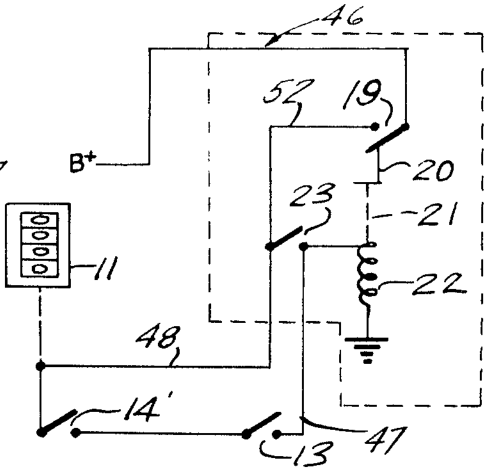
FIG. 2 is a schematic wiring diagram of the invention.

FIG. 2 illustrates the selector device connected to the motor shutoff circuit 46 of the conventional tape recorder. Although for convenience only the set of contacts 14′ is shown in this figure, it is to be understood that the remaining sets 14′–17′ are actually connected in series between the set 14′ and switch 13, as illustrated in FIG. 3.

The circuit 46 is a conventional circuit for deenergizing the motor of a tape recorder and interrupting the movement of the supply and takeup reels when a tape has finished playing. The circuit includes a first switch 19, one terminal of which is connected to a source of electrical energy B+ by a conductor 51. The second terminal of the switch 19 is connected to a first terminal of a second switch 23 through a circuit 52. The second terminal of the switch 23 is connected to one end of a solenoid coil 22. The other end of this coil is grounded. The solenoid also includes a plunger 21 to which the arm of the switch 19 is operably connected by linkage 20. Thus, energization of the solenoid coil causes the switch 19 to open. Once opened, the switch remains open until it is reset manually. The switch 23 is adapted for automatically closing when the end of the tape is reached, thereby energizing the solenoid and opening the switch 19. The recorder motor is connected for receiving electrical energy only when the switch 19 is closed. Thus, opening of the switch 19 causes deenergization of the motor.

The conductors 47 and 48 are connected to the two terminals of the switch 23, and the series of switches in the counter is connected in parallel with this switch.

Operation of the song selector device can now be described briefly as follows. Let it be assumed that a desired song begins 1997 revolutions from the beginning of a tape which has been placed on the tape recorder. The number 1997 is preset on the revolution counter, and the switches 13 and 19 are closed manually. As the tape passes from the supply reel to the takeup reel, the count registered on the counter decreases. After 997 revolutions, the wheel 14 shows a 0, and the contacts 14′ close. After 1997 revolutions, all the wheels show 0, and all the contacts 14′–17′ are closed, thereby energizing the solenoid coil 22. This opens the switch 19 and shuts off the recorder motor. At this point, the listener can play the desired song simply by opening the switch 13 and closing the switch 19. Similarly, any other song on the tape can be selected automatically by presetting on the counter the number corresponding to the location of the song.

It is apparent from the foregoing that a new and improved automatic song selector device has been provided. While only a presently preferred embodiment has been described, it will be apparent to those familar with the art that certain changes and modifications can be made without departing from the scope of the invention as defined by the following claims.

What I now claim is:

1. In an automatic program selector device for tape recorders of the type including supply and take-up reels and electrically energized motive means for driving said reels, a revolution counter removably mounted directly on one of said reels for registering the number of revolutions made by said reel, switch means operably connected to said revolution counter and adapted for actuation when the number registered by said counter reaches a predetermined value corresponding to a desired program and means electrically connecting said switch means to said motive means and its source of electrical energy in such manner that said motive means is deenergized upon actuation of said switch means, thereby interrupting the movement of said supply and take-up reels when the number registered by said counter reaches said predetermined value and conditioning the tape recorder for playing the desired program.

2. A selector device as in claim 1 together with additional switch means electrically connected to said first named switch means for selectively disabling said device so that the movement of said reels will not be interrupted even though the predetermined number is registered in said counter.

3. A selector device is in claim 1 wherein said revolution counter includes a housing formed to include a plurality of windows, a plurality of wheels rotatably mounted on a common axis within said housing, each of said wheels having a plurality of circumferentially spaced digits proximate its outer periphery and each of said wheels being in registry with one of said windows whereby one of the digits on each wheel is visible through its associated window, an input shaft rotatably mounted in said housing and having a mounting disc fixed to one end thereof, means carried by said mounting disc for removably engaging said reel to constrain said input shaft for rotation with said reel, and driving means intermediate said input shaft and said wheels for driving said wheels in such manner that the digits appearing through said windows correspond to the number of revolutions made by said reel and input shaft.

4. A selector device as in claim 3 wherein said switch means includes a set of contacts connected to each wheel, each set of contacts being adapted for closing only when a predetermined digit appears in the window in registry with said wheel and means electrically connecting all of said contacts in series, whereby an electrically conductive circuit is provided through said contacts only when the digits appearing through all of said windows combine to form said predetermined number.

5. A selector device as in claim 3 wherein each wheel is formed to include means for rotating said wheel independently of said input shaft and the remaining wheels whereby said wheel can be preset to an indexing digit and said counter can be preset to an indexing number so that said motive means will be deenergized when the reel upon which said counter is mounted has made the number of revolutions corresponding to the difference between said predetermined number and indexing number.

6. A selector device as in claim 5 wherein said means for rotating said wheel independently includes a knurled portion of greater diameter than the remainder of said wheel, said knurled portion extending through an opening in said housing proximate to the window associated with said wheel.

7. A selector device as in claim 3 wherein said means carried by said mounting disc includes a plurality of lugs adapted for slidably engaging openings formed in said reel.

References Cited

UNITED STATES PATENTS

| | | | |
|---|---|---|---|
| 2,756,279 | 7/1956 | Lang ------------ | 179—100,2 |
| 2,356,145 | 2/1948 | Begun ----------- | 179—100.2 |
| 2,965,720 | 12/1960 | Bumstead --------- | 179—100.1 |
| 2,928,186 | 3/1960 | Hirsch ----------- | 179—100.1 |
| 2,735,915 | 2/1956 | Hagen ----------- | 200—61.41 |
| 1,992,841 | 2/1935 | Roesen ----------- | 200—61.41 |

TERRELL W. FEARS, Primary Examiner

J. ROSENBLATT, Assistant Examiner